(12) United States Patent
Pietilä et al.

(10) Patent No.: US 6,583,759 B2
(45) Date of Patent: Jun. 24, 2003

(54) METHOD FOR DETERMINING A POSITION, A POSITIONING SYSTEM, AND AN ELECTRONIC DEVICE

(75) Inventors: Samuli Pietilä, Tampere (FI); Jari Syrjärinne, Tampere (FI)

(73) Assignee: Nokia Mobile Phones LTD, Espoo (FI)

( * ) Notice: Subject to any disclaimer, the term of this patent is extended or adjusted under 35 U.S.C. 154(b) by 0 days.

(21) Appl. No.: 09/944,853

(22) Filed: Aug. 31, 2001

(65) Prior Publication Data

US 2002/0027525 A1 Mar. 7, 2002

(30) Foreign Application Priority Data

Sep. 1, 2000 (FI) .............................. 20001932

(51) Int. Cl.$^7$ ................................. G01S 5/14
(52) U.S. Cl. .................................. 342/357.15
(58) Field of Search ............................ 342/357.15, 359; 701/213

(56) References Cited

U.S. PATENT DOCUMENTS

| | | | | |
|---|---|---|---|---|
| 4,888,592 A | * | 12/1989 | Paik et al. ................. 342/356 |
| 4,928,107 A | * | 5/1990 | Kuroda et al. ......... 342/357.15 |
| 6,184,824 B1 | * | 2/2001 | Bode et al. ............ 342/357.01 |
| 6,198,432 B1 | * | 3/2001 | Janky .................... 342/357.06 |
| 6,278,404 B1 | * | 8/2001 | Niles .................... 342/357.11 |
| 6,384,778 B1 | * | 5/2002 | Campbell ................... 342/359 |
| 6,392,593 B1 | * | 5/2002 | Pemble .................. 342/357.15 |

FOREIGN PATENT DOCUMENTS

| | | |
|---|---|---|
| EP | 0428827 | 5/1991 |
| WO | WO 98/08109 | 2/1998 |

* cited by examiner

*Primary Examiner*—Gregory C. Issing
(74) *Attorney, Agent, or Firm*—Ware, Fressola, Van Der Sluys & Adolphson LLP

(57) ABSTRACT

The present invention relates to a method for selecting satellites (SV1–SV32) to be used for positioning in a positioning system. The positioning system comprises information on the orbits of the satellites (SV1–SV32). In the method, at least one satellite (SV1–SV32) to be searched for is selected at a time, and a searching step is performed to find out if the signal transmitted by at least one selected satellite (SV1–SV32) can be received. In the method, at least a first searching step and at least one continued selection step are performed, wherein in the continued selection step, at least one satellite (SV1–SV32) is selected at least partly on the basis of the findings of the previous searching step. The selection step is followed by the satellite searching step.

18 Claims, 6 Drawing Sheets

Figure 1:
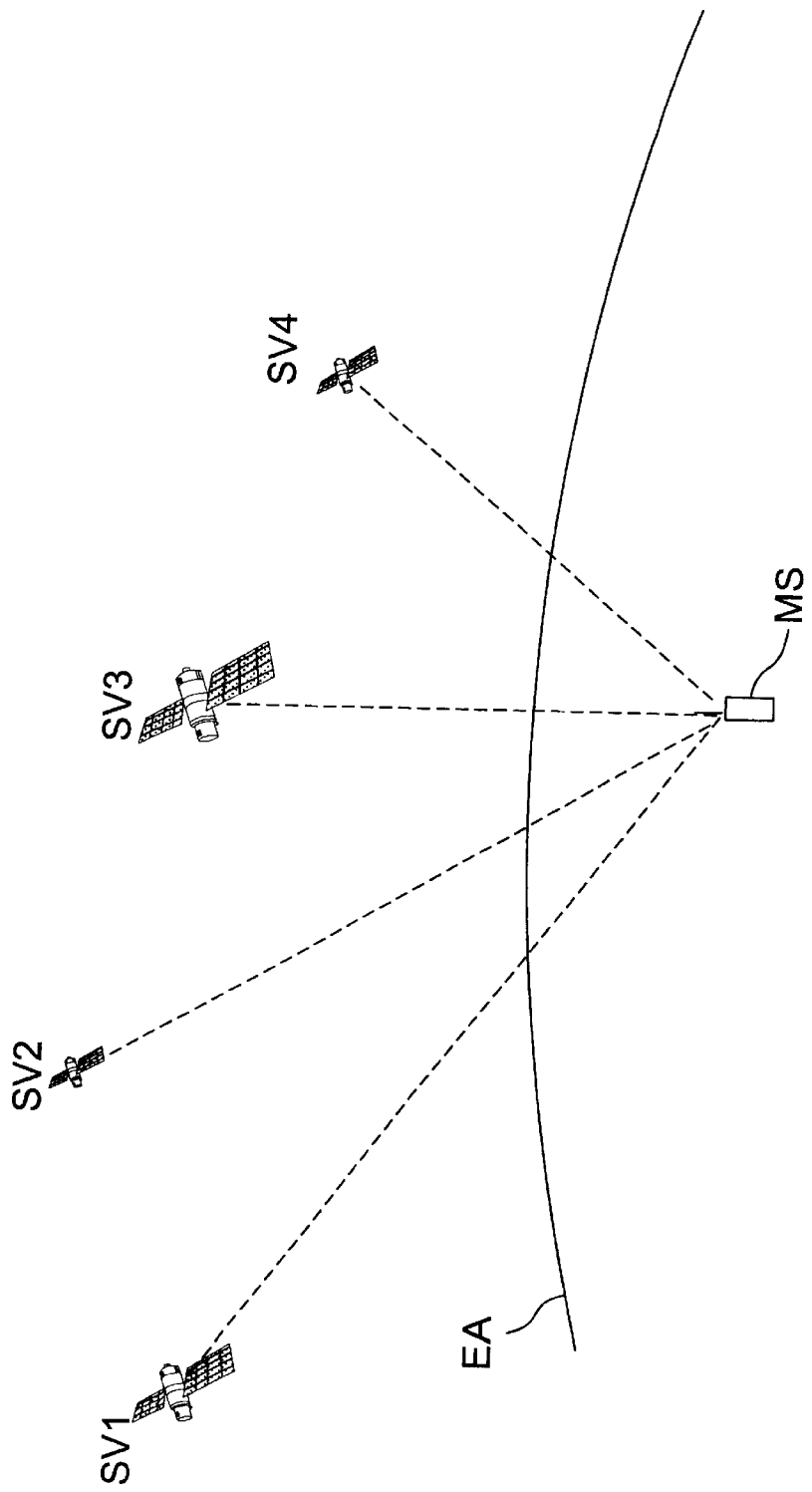

METHOD FOR DETERMINING A POSITION, A POSITIONING SYSTEM, AND AN ELECTRONIC DEVICE

The present invention relates to a method for determining a position according to the preamble of the appended claim 1. The invention also relates to an electronic device according to the preamble of the appended claim 10, and a positioning system according to the preamble of the appended claim 17.

One known positioning system is the GPS system (Global Positioning System) which presently comprises more than 20 satellites. Some of these are out of sight, below the horizon, at a time when viewed from a positioning receiver, wherein the signal of these satellites cannot be received in practice. The satellites transmit e.g. Ephemeris data as well as data on the time of the satellite. A receiver used in positioning normally deduces its position by calculating the propagation time of a signal transmitted simultaneously from several satellites belonging to the positioning system to the receiver. For the positioning, the receiver must typically receive the signal of at least four satellites within sight to compute the position.

Each satellite operating in the GPS system transmits a ranging signal at a carrier frequency of 1575.42 MHz called L1. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, the modulation of these signals is performed with at least one pseudorandom sequence. This pseudorandom sequence is different for each satellite. As a result of the modulation, a code-modulated wideband signal is generated. The modulation technique used makes it possible in the receiver to distinguish between the signals transmitted from different satellites, although the carrier frequencies used in the transmission are substantially the same. This modulation technique is called code division multiple access (CDMA). In each satellite, for modulating the L1 signal, the pseudorandom sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to produce different C/A codes with an identical code generator. The C/A codes are thus binary codes whose chipping rate in the GPS system is 1.023 MHz. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc.

During their operation, the satellites monitor the condition of their equipment. The satellites may use for example so-called watch-dog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which the signal of more than four satellites can be received, different satellites can be weighted differently on the basis of the health data. Thus, it is possible to minimize the effect of errors on measurements, possibly caused by satellites which seem unreliable.

To detect the signals of the satellites and to identify the satellites, the receiver must perform acquisition, whereby the receiver searches for the signal of the satellite and attempts to be synchronized and locked to this signal so that the data transmitted with the signal can be received and demodulated. After the acquisition, the receiver attempts to keep locked, or to track the signal of the satellite at least during the time of positioning, but in some cases, the tracking phase can be maintained as long as the receiver receives the signal of the satellite sufficiently strongly.

The positioning receiver must perform the acquisition e.g. when the receiver is turned on and also in a situation in which the receiver has not been capable of receiving the signal of any satellite for a long time. Such a situation may easily occur for example in portable devices, because the device is moving and the antenna of the device is not always in an optimal position in relation to the satellites, which reduces the strength of the signal coming to the receiver. Also, in urban areas, buildings affect the signal to be received, and furthermore, so-called multipath propagation can occur, wherein the transmitted signal comes into the receiver along different paths, e.g. directly from the satellite (direct line-of-sight) and also reflected from buildings. This multipath propagation causes that the same signal is received as several signals with different phases.

The positioning arrangement has two primary functions:
1. to calculate the pseudorange between the receiver and the different GPS satellites, and
2. to determine the position of the receiver by utilizing the calculated pseudoranges and the position data of the satellites. The position data of the satellites at each time can be calculated on the basis of the Ephemeris and time correction data received from the satellites.

The distances to the satellites are called pseudoranges, because the time is not accurately known in the receiver. Thus, the determinations of position and time are iterated until a sufficient accuracy is achieved with respect to time and position. Because time is not known with absolute precision, the position and the time must be determined e.g. by linearizing a set of equations for each new iteration.

The pseudorange can be calculated by measuring the pseudo transmission time delays between signals of different satellites. After the receiver has been synchronized with the received signal, the information transmitted in the signal is determined.

After the code acquisition has been completed, the next steps are frequency tuning and phase locking. This correlation result also indicates the information transmitted in the GPS signal.

The above-mentioned acquisition and frequency control process must be performed for each signal of a satellite received in the receiver. Some receivers may have several receiving channels, wherein an attempt is made on each receiving channel to be synchronized with the signal of one satellite at a time and to find out the information transmitted by this satellite.

The positioning receiver receives information transmitted by satellites and performs positioning on the basis of the received information. For the positioning, the receiver must receive the signal transmitted by at least four different satellites to find out the x, y, z coordinates and the time data, if none of this information is available for use by the receiver in a sufficiently reliable way. In some cases, it is possible to transmit, e.g. from a base transceiver station, the height data of the base station, wherein for the positioning it is sufficient that the receiver receives the signal transmitted by three satellites. Inaccuracies of a few meters in the height direction do not significantly impair the positioning accuracy. The received navigation information is stored in a memory, wherein of this stored information e.g. satellite position information can be used.

FIG. 1 shows, in a principle chart, positioning in a positioning receiver MS by means of a signal transmitted from four satellites SV1, SV2, SV3, SV4. In the GPS system, the satellites transmit Ephemeris data as well as time data, on the basis of which the positioning receiver can perform calculations to determine the position of the satellite at a time. These Ephemeris data and time data are transmitted in frames which are further divided into subframes. In the GPS system, each frame comprises 1500 bits which are divided into five subframes of 300 bits each. Since the transmission of one bit takes 20 ms, the transmission of each subframe thus takes 6 s, and the whole frame is transmitted in 30 seconds. The subframes are numbered from 1 to 5. In each sub-frame 1, e.g. time data is transmitted, indicating the moment of transmission of the subframe as well as information about the deviation of the satellite clock with respect to the time in the GPS system.

The subframes 2 and 3 are used for the transmission of Ephemeris data. The subframe 4 contains other system information, such as universal time, coordinated (UTC). The subframe 5 is intended for the transmission of almanac data on all the satellites. The entity of these subframes and frames is called a GPS navigation message which comprises 25 frames, or 125 subframes. The length of the navigation message is thus 12 min 30 s.

In the GPS system, time is measured in seconds from the beginning of a week. In the GPS system, the moment of beginning of a week is midnight between a Saturday and a Sunday. Each subframe to be transmitted contains information on the moment of the GPS week when the subframe was transmitted. Thus, the time data indicates the moment of transmission of a certain bit, i.e. in the GPS system, the moment of transmission of the last bit in the subframe. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

At the stage when the positioning receiver is turned on, it must first perform synchronization to at least four satellites to determine the position and the time data. Furthermore, the positioning receivers can perform acquisition and positioning at intervals, wherein possible moving of the positioning receiver can be taken into account in the positioning. If the positioning receiver has position information (almanac data) of the satellites, rough time data (precision on the minute level is usually sufficient) and its own position available at some accuracy, the positioning receiver can usually find out which satellites are in sight at a time. If any of the above-mentioned items of information is missing or is incorrect, the positioning receiver does not know which satellites are in sight. Thus, the positioning receiver must try to find out a sufficient number (at least four) of satellites in sight and perform acquisition. Thus, the positioning receiver can, however, try to perform acquisition also to a signal of a satellite which is out of sight. This increases the time taken on positioning and, on the other hand, also the total power consumption of the positioning receiver. There are positioning receivers known in which acquisition to a satellite is attempted in a certain order, for example in the order of the satellite indices. However, this solution has the draw-back that a lot of time may be spent on finding a sufficient number of satellites in sight, because the predetermined order of searching is not optimal in all situations.

It is an aim of the present invention to provide a method for determining the position of a receiver. It is also an aim of the invention to provide an electronic device comprising a positioning receiver in which the method is applied. The invention is based on the idea of determining the directional angles between the satellites in a preferably Earth centered coordinate system and selecting a first satellite whose signal is attempted to receive. If the signal of the selected satellite is detectable, the signal of the satellite closest to this satellite is next searched for. However, if the signal of the first selected signal is not detected, the satellite selected to be searched next is the satellite farthest from the first selected satellite. The method is iterated until a sufficient number of satellite signals has been received. Directional angles are used in this invention as an indicator of the distance between the satellites. The method according to the present invention is characterized in what will be presented in the characterizing part of the appended claim 1. The electronic device according to the present invention is characterized in what will be presented in the characterizing part of the appended claim 10. Further, the positioning system according to the present invention is characterized in what will be presented in the characterizing part of the appended claim 17.

Considerable advantages are achieved by the present invention when compared with methods and positioning receivers of prior art. When applying the method according to the invention, the positioning can be speeded up, because it is possible with the method to quickly eliminate such satellites which are very probably located below the horizon in view of the positioning receiver. When applying the method of the invention, it is possible to significantly speed up the detection of the satellites required for the positioning when compared with systems of prior art; consequently, also the total power consumption of the electronic device comprising the positioning receiver can be reduced, which is particularly useful in portable electronic devices.

Figure 2:
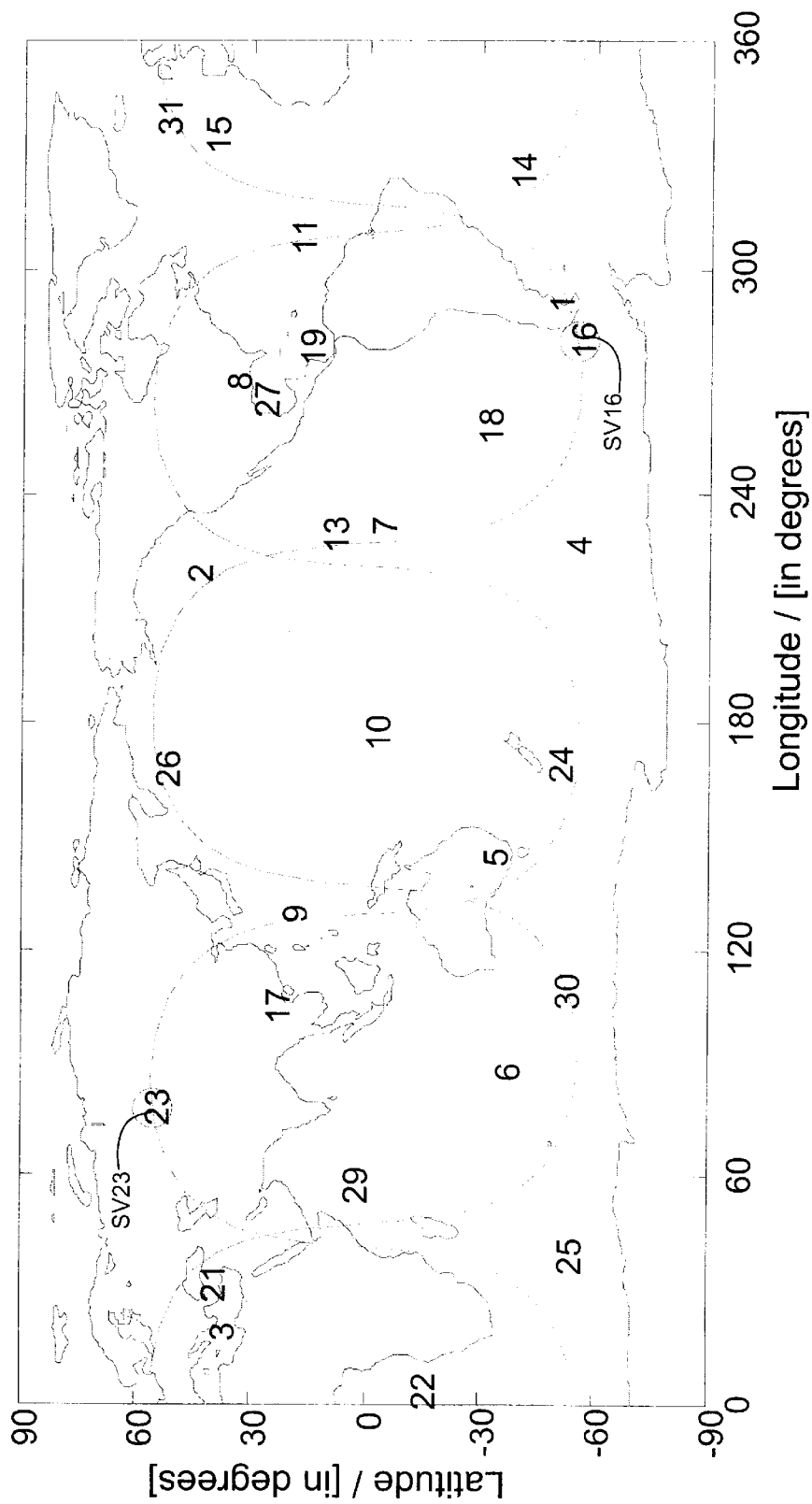
Figure 3:
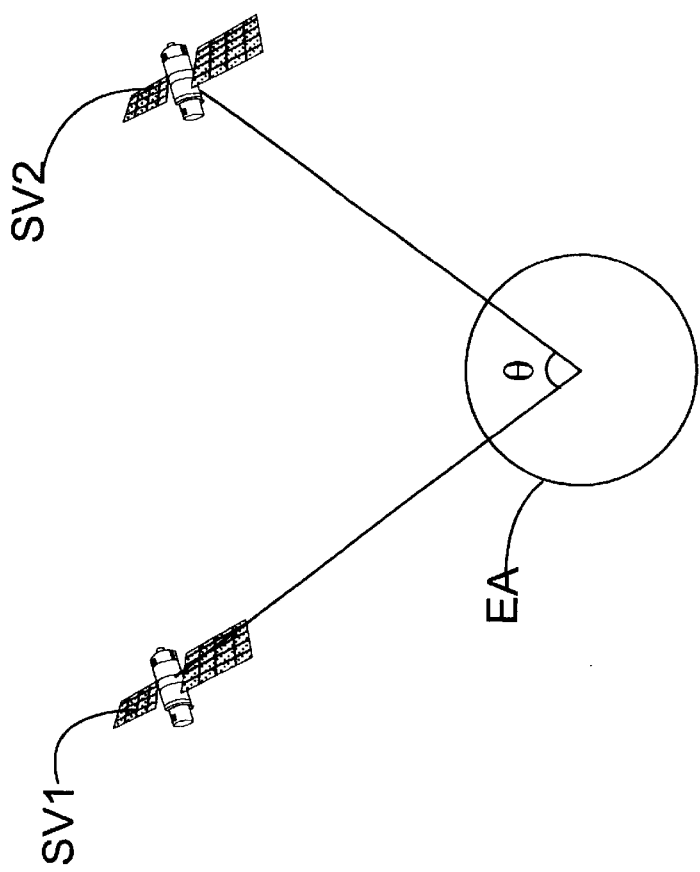
Figure 4A:
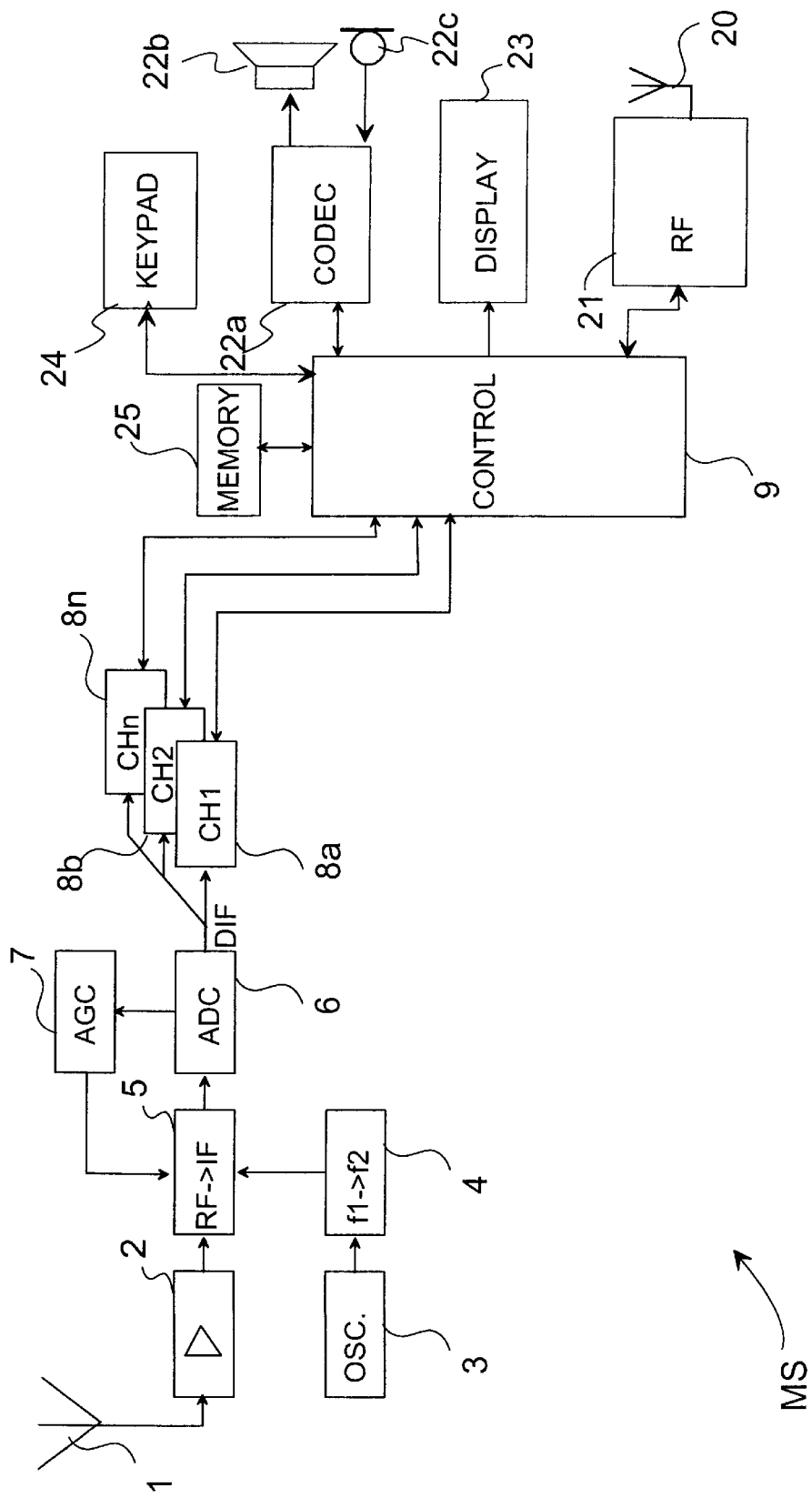
Figure 4B:
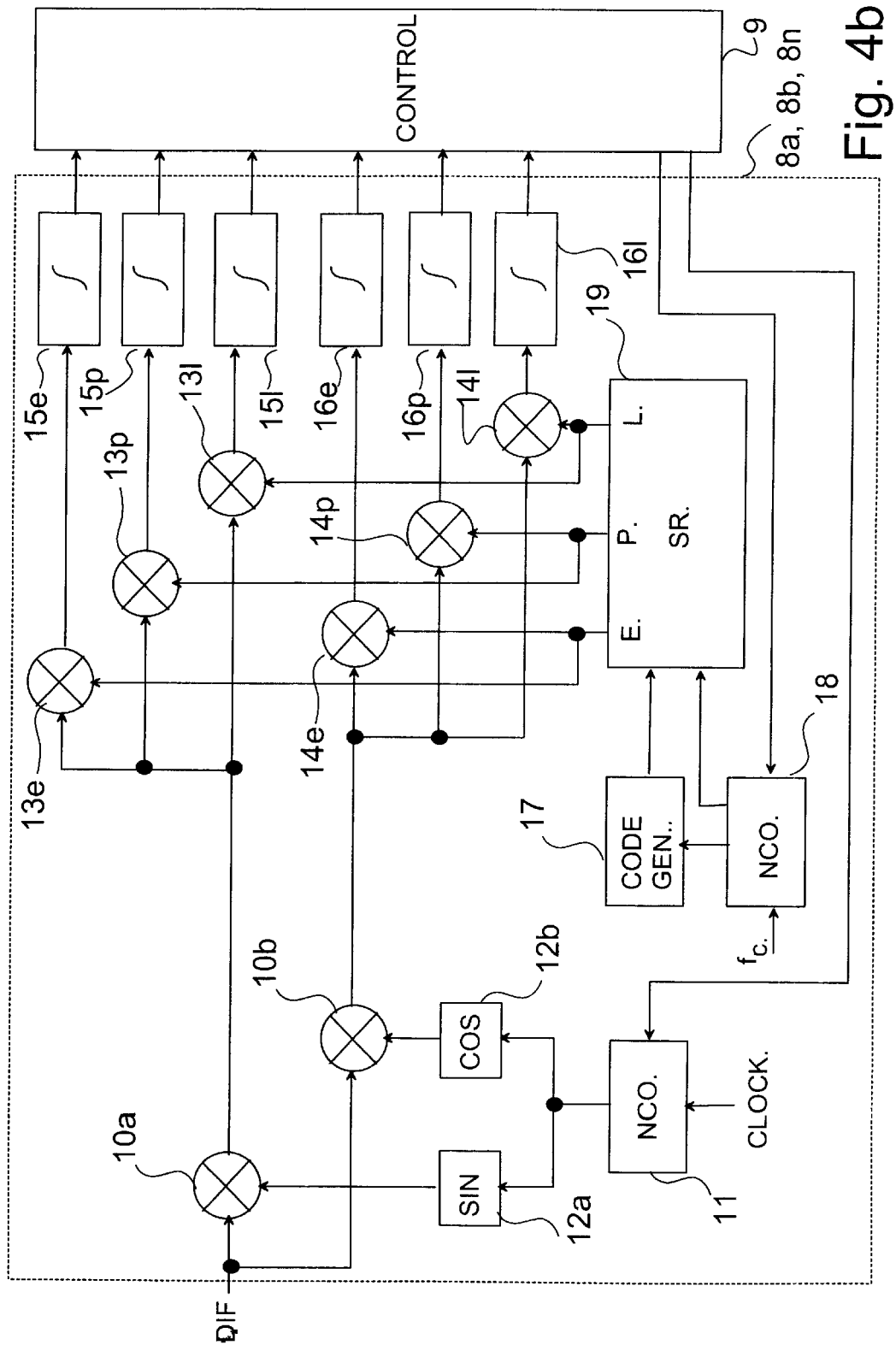
Figure 5:
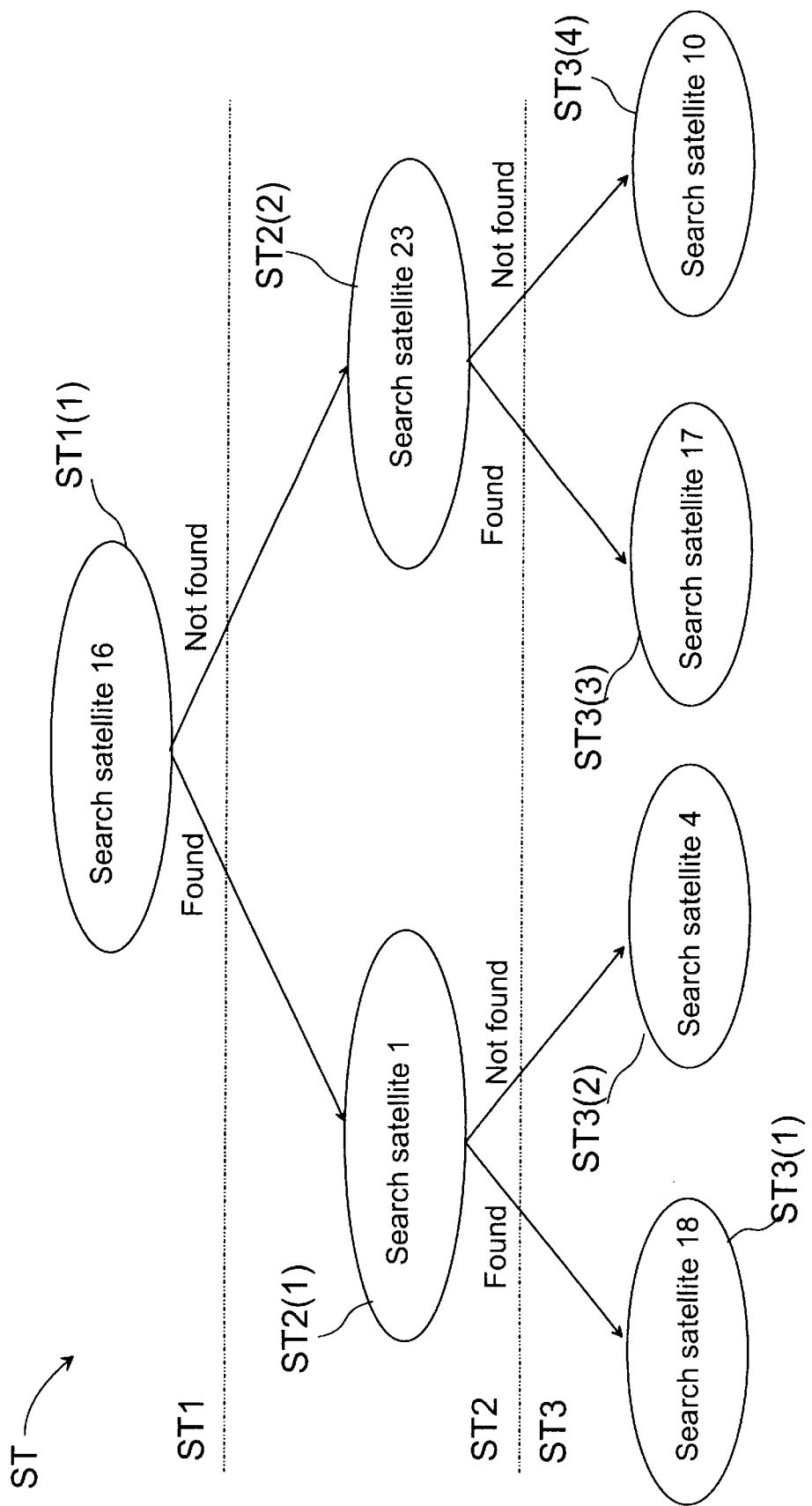

In the following, the invention will be described in more detail with reference to the appended drawings, in which FIG. 1 shows, in a reduced principle chart, positioning by means of a signal transmitted from four satellites, FIG. 2 shows an example of the location of satellites in the GPS system in relation to each other at a moment of time, as well as the orbits of two satellites, FIG. 3 illustrates the determination of the angle between the directional vectors of satellites in a method according to a preferred embodiment of the invention, FIGS. 4a and 4b show, in a reduced block chart, a receiver in which the method according to the invention can be applied, and FIG. 5 shows, in a principle view, an example of a search tree applied in the method according to a preferred embodiment of the invention.

In the method according to the present invention, the angle between the directional vectors of satellites in an earth centered, earth fixed (ECEF) coordinate system is used in the determination of the position between the satellites. This is illustrated in the appended FIG. 3, in which a satellite SV1 and a satellite SV2 are used as examples. Thus, the angle between the directional vectors of the two satellites SV1, SV2, viewed from the centre of the earth EA, is used as an indicator of the distance between these satellites SV1, SV2. For clarity, this angle between the directional vectors will be called a directional angle below in this description. In the method according to an advantageous embodiment of the invention, a directional angle matrix D is formed, whose elements indicate the average directional angles between satellites and other satellites. The directional angles are calculated as follows. The position of a satellite SVi at a moment of time t is indicated with $x_i(t)$, in which i is the satellite index (i=1, . . . , N). As an example, 32 satellites (N=32) are used in the positioning system used in this description, but it is obvious that the number of satellites can be different from said 32. Furthermore, the number of satellites may vary e.g. due to introduction of new satellites, removals and/or reparations of satellites. FIG. 2 shows the positions of satellites 1–11, 13–19, 21–27, and 29–31 at a moment of time. The moment of time preferably indicates the time of a day ($t \in [0,24]$ in hours), because it is assumed here that the period of revolution of the satellites around the earth is 24 hours. In the positioning system, the position of each satellite at different moments of time can be determined on the basis of almanac data. The directional angle between two points x, y at a moment of time t can be obtained by solving the directional angle θ from the following formula (1).

$$\bar{x} \cdot \bar{y} = \|\bar{x}\| \|\bar{y}\| \cos(\theta) \qquad (1)$$

The directional angle obtained is thus $$\theta = arc \, \cos((\bar{x} \cdot \bar{y})/(\|\bar{x}\| \|\bar{y}\|)) \qquad (2)$$

Applying the formula (2) to the satellites, the directional angle $\theta_{i,j}$ between satellites SVi, SVj at a time t can be calculated after finding out the coordinates of the positions of the satellites SVi, SVj from the almanac data. Thus, the directional angle matrix D can be formed by calculating for each satellite the average distances to other satellites in the positioning system. Thus, each element in the directional angle matrix D indicates the average directional angle $\theta_{i,j}$ between the two satellites SVi, SVj during a day. Consequently, each row in the matrix comprises the average distances between a satellite SVi and the other satellites SVj, i.e. $\theta_{i,j} = E[\theta_{i,j}(t)]$, in which E is an expected value operator. In the calculation of the directional angle matrix D, it is possible to use either all the different moments of time in the almanac data, or to determine a time span, according to which the directional angles are calculated, e.g. at intervals of one minute. This time span is affected e.g. by how fast and how much the directional angles are changed at different moments of time.

After determining the directional angle matrix D, a search tree is formed on the basis of the elements in the directional angle matrix D in the method according to a preferred embodiment of the invention. FIG. 5 shows three levels of a search tree ST formed by the method according to a preferred embodiment of the invention. At first, the greatest element in the directional angle matrix D is searched for. The index i of this element in a first direction, preferably a row index, indicates the index SVi of the first satellite to be searched for. This index constitutes the only element on the first level ST1 of the search tree. Next, the second level ST2 of the search tree is determined, comprising two elements ST2(1), ST2(2). According to this advantageous example, the first element ST2(1) is intended for situations in which the satellite indicated by the first level ST1 is found in the acquisition. In a corresponding manner, the second element ST2(2) is intended for situations in which the satellite indicated by the first level ST1 is not found. In the acquisition step, a decision is made on each level, which element of the next, lower level of the search tree will be used when selecting the satellite to be received next. For example, on the uppermost level ST1, if the receiver detects the signal of the satellite according to the value of the element, the next step according to this example is to receive the signal of the satellite complying with the value of the first element ST2(1) of the second level. In this way, lower levels of the search tree are entered, until a sufficient number of such satellites are found which are above the horizon in relation to the positioning receiver. This search for satellites in the acquisition will be described in more detail below in this description, which is referred to in this context.

The first element ST2(1) of the second level is preferably selected by searching for the smallest element on row i in the directional angle matrix D under discussion. The index j of this element in the other direction, preferably a column index, indicates the index SVj of the satellite with the smallest directional angle to the satellite indicated by the first level ST1 of the search tree, i.e. the satellite SVj is closest to the satellite SVi, which the receiver has been able to synchronize with.

In a corresponding manner, the second element ST2(2) of the second level is preferably selected by searching for the greatest element on the row i in the directional angle matrix D under discussion. The index j of this element in the other direction, preferably the column index, indicates the index SVj of the satellite with the greatest directional angle to the satellite indicated by the first level ST1 of the search tree, i.e. the satellite SVj is farthest from the satellite SVi, which the receiver was not able to synchronize with.

In the example of FIG. 5, the satellite with the index 16 is the satellite to be selected first. In a corresponding manner, the value for the first element on the second level is the first element on row 16, i.e. the satellite SV1 is closest to the satellite SV16. The value for the second element on the second level is the 23rd element on row 16, i.e. the satellite SV23 is farthest from the satellite SV16. This can also be seen in FIG. 2 showing the positions of the satellites SV1–SV11, SV13–SV19, SV21–SV27, and SV29–SV31 at a moment of time. FIG. 2 also shows the orbits of the satellites SV16 and SV23.

The above-presented steps are iterated to form the other levels STk of the search tree ST. Since, on a lower level k of the search tree, two elements (satellite found/not found) are formed for each element of an upper level k−1, the number of elements on the level k is $2^{k-1}$. The $m^{th}$ element STk(m) of the level STk (m=1, . . . , $2^{k-1}$) is formed in the following way, assuming that the directional angle matrix D is processed row by row. The rows of the directional angle matrix D according to the indices of the satellites found earlier in the acquisition are summed up, and the rows of the directional angle matrix D according to the indices of the satellites not previously found are deducted, wherein one row vector is formed. The index of the element with the smallest value in the row vector is selected as the value for the element STk(m). However, in this search for the smallest value, such elements must be eliminated that have an index for a satellite that has already been processed on a previous level. Let us describe this further with reference to the example of FIG. 5. To calculate the value for the first element ST3(1) of the third level ST3, a row vector is formed by adding up the values of the elements on rows 1 and 16 of the directional angle matrix (satellites 1 and 16 found). Of the row vector, the smallest value is searched for, whose index is stored as the value for the first element ST3(1) of the third level. To calculate the value for the second element ST3(2) of the third level ST3, a row vector is formed by deducting the values of the elements on row 16 from the elements on row 1 of the directional angle matrix (satellite 16 found, satellite 1 not found). Of the row vector, the smallest value is again searched for, whose index is stored as the value for the second element ST3(2) of the third level. To calculate the value for the third element ST3(3) of the third level ST3, a row vector is formed by deducting the values of the elements on row 16 from the elements on row 23 of the directional angle matrix (satellite 23 found, satellite 16 not found). Of the row vector, the smallest value is again searched for, whose index is stored as the value for the third element ST3(3) of the third level. Yet to calculate the value for the fourth element ST3(4) of the third level ST3, a row vector is formed by forming a row vector of the sum of the opposite values of the elements on rows 16 and 23 of the directional angle matrix (=(−row 16)+(−row 23), because neither satellite 16 or 23 was found). Of the row vector, the smallest value is again searched for, whose index is stored as the value for the fourth element ST3(4) of the third level. In the example of FIG. 5, the first element ST3(1) and the second element ST3(2) of the third level cannot receive the values 1 or 16, because they are already used on upper levels in this branch of search. In a corresponding manner, the third element ST3(3) and the fourth element ST3(4) of the third level cannot receive the values 16 or 23, because they are already used on upper levels in this branch of search. In other words, the element of a level cannot receive the values directly above the element in the search tree, i.e. the values previously occurred in the corresponding branch of search. On the other hand, an element of a level can receive such values above the element in the search tree which are not in the same branch of search as the element in question.

The formation of the search tree is continued as presented above, until a predetermined number of levels have been formed. This number is dependent on the application in question, and it is affected e.g. by the memory capacity available. As increasing the number of levels by one will double the number of elements in the search tree, the need for memory capacity will increase very rapidly even with a few levels. For example, if the number of levels is 20, the number of elements is $2^{20-1} \approx 500{,}000$. In practice, a suitable number of levels is preferably in the order of 8 to 10, but it is obvious that search trees of other sizes can also be used in connection with the present invention.

Because the orbits of the satellites do not normally change considerably on different days, the above-described formations of the directional angle matrix and the search tree do not need to be performed in connection with every acquisition, but the search tree can be formed in connection with e.g. manufacturing of the device and be stored in a memory. Recalculation of the search tree can be performed when new satellites are introduced in and/or satellites are removed from service in the positioning system.

The following is a description on the operation of the method according to an advantageous embodiment of the invention, using the GPS satellite positioning system as an example and with reference to the search tree of FIG. 5 and the example situation of FIG. 2. At first, the element on the first level ST1 of the search tree will be examined. This indicates the index of the satellite which the positioning receiver will first try to synchronize with. Let us assume that the satellite defined to be the first satellite to be selected in the search tree is the one with the index 16. After this, the positioning receiver starts to perform acquisition to this signal. If the receiver is capable, preferably within a predetermined time, to synchronize with the signal of this satellite SV16, the decision can be made that the satellite is within sight of the positioning receiver, i.e. above the horizon. Thus, from the second level ST2 of the search tree, that element is selected, whose stored value matches with the index of the satellite closest to the first examined satellite. In this preferred embodiment, this element is the first element ST2(1) of the second level. However, if acquisition to the first selected satellite is not successful, the satellite selected to be examined next is the one whose index is stored as the value for the second element ST2(2) of the second level in the search tree. In this situation, it is assumed that the first examined satellite is below the horizon at the time when viewed from the positioning receiver, and that the satellite selected next is substantially on the opposite side of the earth than the first examined satellite. Thus, from the second level ST2 of the search tree, that element is selected, whose stored value matches with the index of the satellite farthest from the first examined satellite. After selecting the satellite to be examined next, the positioning receiver tries to receive the signal of the satellite indicated by the value of this element selected from the second level.

The positioning receiver will now try to acquire the signal of this satellite selected from the second level. If the positioning receiver detects the signal of the satellite and is capable of acquisition, it is examined if a sufficient number of satellites in sight have already been detected for positioning. If positioning cannot yet be performed at a sufficient accuracy, the next level is entered in the search tree. From this level, an element is again selected which corresponds to the search result of the previous level (satellite found/not found). That is, in practice, when moving from one level to the next one, a selection is made between two elements, irrespective of the number of elements on the next level, as can be seen e.g. in FIG. 5.

If a sufficient number of satellites is not found until reaching the lowest level in the determined search tree, the search can be continued e.g. by a method according to prior art.

After the positioning receiver has found a sufficient number of such satellites in sight which transmit signals whose acquisition has been successful, the positioning receiver can also perform the positioning. Typically, at least four satellites are needed to be able to perform the positioning (x, y, z coordinates as well as time t). This positioning is prior art known per se, wherein its description in more detail will not be necessary in this context.

Although it was presented above that the search tree ST is calculated and stored in a memory, it is obvious that the calculations corresponding to building up the search tree ST can be made in connection with the acquisition on the basis of the directional angle matrix D, wherein the search tree ST does not necessarily need to be stored.

Next, the operation of an advantageous positioning receiver MS will be briefly described with reference to the reduced block charts of FIGS. 4a and 4b. The signal to be received via an antenna 1 is amplified in a high-frequency amplifier 2 and modified by means of a clock signal generated by a clock generator 3 and a frequency synthesizer 4 preferably to an intermediate frequency or directly to a baseband in a modifying block 5. At this stage, the signal is still in analog format, wherein it is converted to a digital signal in an analog-to-digital converter 6. The analog-to-digital converter 6 produces not only a digital receiving signal but also a control to an automatic gain control 7 (AGC) which tries to level out strength variations in the received signal in a way known as such. The digital signal converted to an intermediate frequency or the baseband is led to one or more digital synchronization blocks 8I, 8*b*, 8*n* to perform conversion of the digital signal to two signals with different phases (I/Q) and multiplication with a reference code. The signals formed in the synchronization blocks 8a, 8b, 8n are further conducted to a control block 9 for trying to find out the code phase and frequency shift of the received signal. The control block 9 forms a back coupling to the synchronization blocks 8a, 8b, 8n to adjust the code phase of the reference code and a numerically controlled oscillator 18, if necessary. After the code phase and the frequency shift have been found out, i.e. the receiver has been synchronized with the signal transmitted by the satellite, it is possible to demodulate the information modulated in the signal.

An advantageous structure for the digital synchronization blocks 8a, 8b, 8n is shown in the block chart of FIG. 4b. The digital signal converted to an intermediate frequency or the baseband is mixed in mixers 10a, 10b with the signal generated by a numerically controlled oscillator 11 in such a way that there is phase difference of about 90° between the oscillator signal to be input in the first mixer 10a and the oscillator signal to be input in the second mixer 10b. Thus, the mixing result is a signal comprising two components in a way known as such: the I and Q components. In the formation of the phase difference, phase shift blocks 12a, 12b are preferably used. Next, the I and Q components are subjected to multiplication with the reference code in code multipliers 13e, 14e; 13p, 14p; 13l, 14l. The reference code is led in different phases to the code multipliers 13e, 14e; 13p, 14p; 13l, 14l preferably so that three or more reference signals with different phases are formed of both the I component and the Q component. These code multiplier output signals are preferably e.g. integrated in integration blocks 15e, 16e; 15p, 16p; 15l, 16l. From the integration blocks 15e, 16e; 15p, 16p; 15l, 16l, the integrated signals are led to the control block 9, where, on the basis of the output signals of the different integration blocks, it is deduced e.g. whether the code phase of the reference code is leading, behind or in the same phase as the code phase of the received signal. On the basis of this deduction, the control block 9 will adjust the frequency of the numerically controlled oscillator 18 controlling the reference code generator 17. Furthermore, reference code signals with different phases are formed of the reference code generated by the reference code generator 17 in a phase shift block 19. Furthermore, the control block 9 deduces the possible frequency shift and adjusts the frequency of the numerically controlled oscillator 11. In each synchronization block, signal processing can be performed for one signal at a time, wherein to receive the signals of e.g. four satellites simultaneously, there must be at least four synchronization blocks. It is obvious that the receiver shown in FIGS. 4a and 4b is only an example embodiment, but the present invention is not limited to be used in this receiver only.

The positioning receiver MS preferably also comprises means for performing the functions of the wireless device, such as a second antenna 20, a radio part 21, audio means, such as a codec 22a, a speaker 22b and a microphone 22c, a display 23, a keypad 24, and a memory 25. The control block 9 can be at least partly common to perform the functions of the positioning receiver and to perform the functions of the wireless communication device, or separate processors or the like can be used for these functions.

When simulating the method of the invention, it has been found that using the method, positioning can be accelerated even by half when compared with methods of prior art, particularly under weak signal conditions and in situations in which the positioning receiver MS has no reliable information on the satellites in sight. Assuming that the time used for finding the signal of one satellite by prior art methods, particularly in a weak signal field, is typically in the order of 10 s in a situation in which a signal cannot be received and, correspondingly, in the order of 5 s in a situation in which the signal is received, and that an average of 12 searches are needed to find the signals of four satellites, the time required for this is approximately 8×10 s+4×5 s=100 s. Applying the method of the invention, the average number of searches with the corresponding assumptions is about 7, wherein the time used for searching is reduced to 3×10 s+4×5 s=50 s. Consequently, by using the method of the invention, the time used for the search can be significantly reduced.

The invention can also be applied in such a way that at one step of selection, more satellites than one are selected to be searched. Furthermore, in the searching step, it is possible to search for more than one selected satellites.

The functions of the method according to the invention can be largely implemented in the application software of the control block 9 of the positioning receiver MS, but it is obvious that also other solution alternatives can be applied on the basis of the above description.

It is obvious that the present invention is not limited solely to the above-presented embodiments, but it can be modified within the scope of the appended claims.

What is claimed is:

1. A method for selecting satellites, said satellites to be used for positioning in a positioning system which includes information on the orbits of the satellites, the method comprising the following steps:
    performing at least a first selection step and one or more continued selection steps to select at least one selected satellite to be searched for, and
    taking a searching step, after each of said first selection step and said one or more continued selection steps, to examine whether a signal transmitted by the at least one selected satellite is detected,
    wherein, during the continued selection step, at least one satellite is selected based at least partly on a finding about detectability from the searching step taken previously.

2. The method according to claim 1, wherein in the continued step, the satellite to be searched is selected to be either:
    in the direction of the satellite selected in the previous selection step, if the signal transmitted by the satellite selected in the previous selection step is detected, or
    substantially on the opposite side of the earth in relation to the satellite searched for in the previous step, if the signal transmitted by the satellite selected in the previous selection step is not detected.

3. The method according to claim 1,
    wherein a directional angle matrix is formed,
    wherein an element in the directional angle matrix is formed,
    wherein an element in the directional angle matrix indicates the directional angle between two satellites in a preferably earth centered coordinate system, and
    wherein the values of the elements of said matrix are used in said selection steps for selecting the satellite to be searched next.

4. The method according to claim 3, wherein said directional angle matrix is formed of a set of directional angle vectors, in which one directional angle vector comprises the directional angles from one satellite.

5. A method according to claim 3, wherein said directional angle matrix is formed on the basis of orbit information of the satellites.

6. The method according to claim 5, wherein in the determination of the directional angles, orbit information of the satellites from a determined time span are used, on the basis of which the expected values of the directional angles are calculated.

7. The method according to claim 3, wherein on the basis of the directional angle matrix, a search tree is formed to select the satellite to be used in the selection steps.

8. The method according to claim 4,
wherein the values of the elements of the directional angle vectors are examined, and
wherein, if the signal transmitted by the satellite selected in the first selection step is detected, then the satellite selected in the first continued selection step has a corresponding element that is smallest in said directional angle vector, but otherwise the satellite selected in the first continued selection step has a corresponding element that is largest in said directional angle vector.

9. The method according to claim 1, further comprising sets of steps substantially similar to the method according to claim 1, wherein the sets of steps are performed iteratively until the number of satellites required for the positioning has been found.

10. The method of claim 1, wherein the information on the orbits is used for selection of satellites, to the extent of using angles between directional vectors of satellites.

11. An electronic device comprising:
a positioning receiver;
means for selecting satellites to be used for positioning in a positioning system which includes information on the orbits of the satellites;
means for selecting at least one satellite to be searched for; and
means for searching for at least one selected satellite by finding out if the signal transmitted by the selected satellite is detected,
wherein the electronic device further comprises means for performing at least a first selection step, and means for performing one or more continued selection steps,
wherein the electronic device is arranged to perform a searching step after each of said first selection step and said one or more continued selection steps to examine whether the signal transmitted by at least one selected satellite is detected,
wherein during the continued selection step, the selection of at least one satellite is arranged to be performed at least partly based on a finding about detectability in the searching step previously taken.

12. The electronic device according to claim 11, wherein the electronic device comprises a directional angle matrix, in which an element in the matrix indicates the directional angle between two satellites in a preferably earth centered coordinate system, and wherein the electronic device comprises means for using the values of the elements of said matrix in said selection steps for selecting the satellite to be searched next.

13. The electronic device according to claim 12, wherein said directional angle matrix is formed of a set of directional angle vectors, in which one directional angle vector comprises the directional angles from one satellite to the other satellites.

14. The electronic device according to claim 12, wherein a said directional angle matrix is formed on the basis of orbit information of the satellites.

15. The electronic device according to claim 14, wherein in the determination of the directional angles, orbit information on the satellites from a determined time span are used, on the basis of which the expected values of the directional angles are calculated.

16. The electronic device according to claim 11, wherein the electronic device comprises means for iterating said continued selection steps until the number of required for the positioning is found.

17. The electronic device according to claim 12, wherein on the basis of the directional angle matrix, a search tree is formed, and wherein the electronic device comprises means for using the search tree to select the satellite to be used in the selection steps.

18. A positioning system comprising:
a positioning receiver;
means for selecting the satellites to be used for positioning;
information on the orbits of the satellites;
means for selecting at least one satellite to be searched; and
means for searching at least one selected satellite by finding out if the signal transmitted by the selected satellite is detected,
wherein the positioning system further comprises means for performing at least a first selection step, and means for performing one or more continued selection steps,
wherein the searching means is arranged to perform a searching step, after each of said first selection step and said one or more continued selection steps, to examine whether the signal transmitted by at least one selected satellite is detected,
wherein the selection means is arranged to select, during the continued selection step, at least one satellite that is selected at least partly based on a finding about detectability in the searching step previously taken.

* * * * *

UNITED STATES PATENT AND TRADEMARK OFFICE
CERTIFICATE OF CORRECTION

PATENT NO.   : 6,583,759 B2
DATED        : June 24, 2003
INVENTOR(S)  : Pietilä et al.

It is certified that error appears in the above-identified patent and that said Letters Patent is hereby corrected as shown below:

<u>Column 8,</u>
Line 67, "81" should be -- 8a --

<u>Column 12,</u>
Line 21, after "of" -- satellites -- should be inserted

Signed and Sealed this

Twenty-eighth Day of October, 2003

JAMES E. ROGAN
*Director of the United States Patent and Trademark Office*